(12) United States Patent
Nakanishi et al.

(10) Patent No.: US 8,735,825 B2
(45) Date of Patent: May 27, 2014

(54) OPTICAL POSITION DETECTION DEVICE

(75) Inventors: Daisuke Nakanishi, Matsumoto (JP); Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 204 days.

(21) Appl. No.: 13/441,430

(22) Filed: Apr. 6, 2012

(65) Prior Publication Data

US 2012/0257190 A1 Oct. 11, 2012

(30) Foreign Application Priority Data

Apr. 8, 2011 (JP) .................... 2011-086072

(51) Int. Cl.
*G01J 5/02* (2006.01)
*G01B 11/00* (2006.01)
*G01S 17/06* (2006.01)
*G06F 3/042* (2006.01)

(52) U.S. Cl.
CPC ...... *G01S 17/06* (2013.01); *G06F 3/042* (2013.01)
USPC ... 250/341.7; 356/614; 356/615; 250/559.29; 250/559.38; 250/559.33; 250/559.3

(58) Field of Classification Search
CPC .................... G01S 17/02; G01S 17/06
USPC ............ 356/614, 615; 250/341.7, 559.29, 250/559.38, 559.33, 559.3
See application file for complete search history.

(56) References Cited

U.S. PATENT DOCUMENTS

| 6,953,926 | B2 | 10/2005 | Reime | |
|---|---|---|---|---|
| 2005/0128190 | A1* | 6/2005 | Ryynanen | ............ 345/173 |
| 2011/0063123 | A1 | 3/2011 | Jones | |
| 2011/0128553 | A1 | 6/2011 | Nakanishi | |
| 2011/0128554 | A1* | 6/2011 | Nakanishi | ............ 356/621 |
| 2011/0157603 | A1* | 6/2011 | Alvarez Diez et al. | ....... 356/614 |
| 2011/0243702 | A1 | 10/2011 | Nakanishi et al. | |
| 2011/0267315 | A1 | 11/2011 | Nakanishi et al. | |

FOREIGN PATENT DOCUMENTS

| JP | 05-306906 | 11/1993 |
|---|---|---|
| JP | 06-042915 | 2/1994 |
| JP | 06-229755 | 8/1994 |
| JP | 06-281749 | 10/1994 |
| JP | 07-113621 | 5/1995 |
| JP | 08-247780 | 9/1996 |
| JP | 08-313435 | 11/1996 |
| JP | 2000-234907 | 8/2000 |

(Continued)

*Primary Examiner* — David Porta
*Assistant Examiner* — Yara B Green
(74) *Attorney, Agent, or Firm* — Harness, Dickey & Pierce, P.L.C.

(57) ABSTRACT

In an optical position detection device, when light source sections emit detection light, a light detecting section detects detection light reflected from a object to detect the coordinates of the object. When seen from the detection space, the light detecting section is located inward from a plurality of light source sections, and each of the plurality of light source sections includes first and second light emitting elements. Therefore, the position of the object can be detected on the basis of a comparison result of the received light intensity in the light detecting section when the first light emitting element is turned on and the received light intensity in the light detecting section when the second light emitting element is turned on in both the case where the object is located outside a region between the light source sections and the case where the object is located inside the region.

6 Claims, 8 Drawing Sheets

(56) References Cited

FOREIGN PATENT DOCUMENTS

| | | |
|---|---|---|
| JP | 2003-534554 | 11/2003 |
| JP | 2010-186217 | 8/2010 |
| JP | 2010-211355 | 9/2010 |
| JP | 2011-060260 | 3/2011 |
| JP | 2011-117751 | 6/2011 |
| JP | 2011-215100 | 10/2011 |
| JP | 2011-215101 | 10/2011 |
| JP | 2011-215102 | 10/2011 |
| JP | 2011-227026 | 11/2011 |
| JP | 2011-227027 | 11/2011 |
| JP | 2011-232191 | 11/2011 |

\* cited by examiner

OPTICAL POSITION DETECTION DEVICE

BACKGROUND

1. Technical Field

The present invention relates to an optical position detection device which detects a target object optically.

2. Related Art

There are various kinds of optical position detection devices which detect a target object optically. Among such various kinds of optical position detection devices, a device configured to include two light source sections for detection and one light detecting section is disclosed in JP-T-2003-534554. As shown in FIG. 8, JP-T-2003-534554 proposes that detection light L2 is emitted from two light source sections for detection 12 toward a target object Ob through a light transmissive member 40 and detection light reflected from the target object Ob is transmitted through the light transmissive member 40 and is then detected by a light detecting section 30, for example. In the optical position detection device, the relationship of the distance between one of the two light source sections for detection 12 and the target object Ob and the distance between the other light source section for detection 12 and the target object Ob can be seen if the two light source sections for detection 12 are driven so that the difference therebetween is obtained on the basis of a detection result of the light detecting section 30, for example. Therefore, the position of the target object Ob can be detected.

In the configuration shown in FIG. 8, however, there is a problem in that the relationship of the distance between one of the two light source sections for detection 12 and the target object Ob and the distance between the other light source section for detection 12 and the target object Ob becomes the same when the target object Ob shown as a target object Ob1 is located inside a region between the two light source sections for detection 12 and when the target object Ob shown as a target object Ob2 is located outside the region between the two light source sections for detection 12. For this reason, when calculating the relationship of the distance between one of the two light source sections for detection 12 and the target object Ob and the distance between the other light source section for detection 12 and the target object Ob, it is not possible to determine whether the distance between the two light source sections for detection 12 is to be internally divided or externally divided.

SUMMARY

An advantage of some aspects of the invention is to provide an optical position detection device capable of detecting the position of a target object in both a case where the target object is located outside a region between light sources for detection and a case where the target object is located inside the region.

Application Example 1

This application example of the invention is directed to an optical position detection device that detects a position of a target object optically and includes: a plurality of light source sections for detection that emit detection light in an emission direction and are separated from each other in a direction crossing the emission direction; a light detecting section that receives the detection light reflected from the target object; a light source driving section that turns on the light source sections for detection; and a position detecting section that detects the position of the target object on the basis of a light receiving result of the light detecting section. Each of the light source sections for detection includes first to third light emitting elements for detection disposed on a straight line, and the position detecting section detects the position of the target object using a first detection position, which is obtained when calculating the position of the target object using the first and second light emitting elements for detection, and a second detection position, which is obtained when calculating the position of the target object using the first and third light emitting elements for detection.

According to this application example, the optical position detection device is a device which detects the position of the target object optically, and includes the plurality of light source sections for detection, the light detecting section, the light source driving section, and the position detecting section. The plurality of light source sections for detection emit detection light in the emission direction and are separated from each other in a direction crossing the emission direction. The light source driving section turns on the light source sections for detection. The light detecting section receives the detection light reflected from the target object. The position detecting section detects the position of the target object on the basis of a light receiving result of the light detecting section.

Each of the light source sections for detection includes the first to third light emitting elements for detection disposed on the straight line. The position detecting section calculates the position of the target object using the first and second light emitting elements for detection and sets the calculated value as the first detection position. In addition, the position detecting section calculates the position of the target object using the first and third light emitting elements for detection and sets the calculated value as the second detection position. Then, the position of the target object is detected using the first and second detection positions.

The first detection position calculated by the light source section for detection indicates the positional relationship estimated from the distance between the first light emitting element for detection and the target object and the distance between the second light emitting element for detection and the target object. For this reason, the first detection position may not be one place but may be a plurality of places. Similarly, the second detection position calculated by the light source section for detection indicates the positional relationship estimated from the distance between the first light emitting element for detection and the target object and the distance between the third light emitting element for detection and the target object. For this reason, the second detection position may not be one place but may be a plurality of places. In addition, it is possible to accurately detect the position of the target object by calculating the position common to the conditions of the first and second detection positions. As a result, the position of the target object can be detected in both the case where the target object is located outside a region where the light source sections for detection are disposed and the case where the target object is located inside the region.

Application Example 2

In the optical position detection device according to the above-described application example, it is preferable that the position detecting section calculate the first detection position from light intensities of light beams emitted from the first and second light emitting elements for detection and a light intensity of the detection light received by the light detecting section and calculate the second detection position from light intensities of light beams emitted from the first and third light emitting elements for detection and the light intensity of the detection light received by the light detecting section.

According to this application example, the detection position is calculated from the light intensities of light beams emitted from the light emitting elements and the light intensity of received detection light. Since the light intensity is correlated with distance, the ratio of distances can be estimated by comparing the light intensities of light beams. Accordingly, it is possible to calculate the positional relationship estimated from the distance between the first light emitting element for detection and the target object and the distance between the second light emitting element for detection and the target object. Similarly, it is possible to calculate the positional relationship estimated from the distance between the first light emitting element for detection and the target object and the distance between the third light emitting element for detection and the target object.

Application Example 3

In the optical position detection device according to the above-described application example, it is preferable that, assuming that the emission direction of the detection light is a Z-axis direction and two directions crossing the Z-axis direction are an X-axis direction and a Y-axis direction, the plurality of light source sections for detection include the light source sections for detection separated from each other in the X-axis direction and the light source sections for detection separated from each other in the Y-axis direction.

According to this application example, the positions of the target object and the light source sections for detection can be detected in the X-axis direction and the Y-axis direction. In addition, since the X-axis direction and the Y-axis direction cross each other, the optical position detection device can detect the position of intersection of the plane including the X-axis direction and the Y-axis direction and the straight line in the Z-axis direction passing through the target object.

Application Example 4

In the optical position detection device according to the above-described application example, it is preferable to further include a reference light source that emits reference light incident on the light detecting section without being reflected by the target object. Moreover, preferably, the position detecting section detects the position of the target object by changing a combination of the reference light source and some of the plurality of light source sections for detection on the basis of a light receiving result of the light detecting section.

According to this application example, the optical position detection device includes the reference light source that emits reference light incident on the light detecting section without being reflected by the target object. The position detecting section detects the position of the target object by changing the combination of the reference light source and some of the plurality of light source sections for detection on the basis of a light receiving result of the light detecting section. Since the reference light is not influenced by ambient light and the like, the position detecting section can correct the influence of ambient light and the like.

Application Example 5

In the optical position detection device according to the above-described application example, it is preferable that the position detecting section detect the position of the target object in the emission direction of the detection light on the basis of a light receiving result of the light detecting section when the plurality of light source sections for detection are turned on simultaneously or sequentially.

According to this application example, the positions of the light source sections for detection can be set to different places by turning on the plurality of light source sections for detection sequentially. Therefore, the relative positions of the light detecting section and the light source sections for detection with respect to the target object can be changed. As a result, the planar position of the target object can be detected. In addition, the distance of the location where the plurality of light source sections for detection are disposed and the intensity of emitted light can be made to have a predetermined distribution by turning on the plurality of light source sections for detection simultaneously. Therefore, the distance between the light source section for detection and the target object can be detected by detecting the intensity of detection light reflected from the target object.

Application Example 6

In the optical position detection device according to the above-described application example, it is preferable that the detection light be infrared light.

According to this application example, since detection light is infrared light, the detection light is not visible. Accordingly, even if the optical position detection device is applied to a display device, the display is not interrupted. For this reason, the optical position detection device can be used in various kinds of apparatuses.

BRIEF DESCRIPTION OF THE DRAWINGS

The invention will be described with reference to the accompanying drawings, wherein like numbers reference like elements.

FIG. 5A is a schematic view for explaining the relationship between the distance from a light source section for detection to a target object and the received light intensity of detection light or the like.

DESCRIPTION OF EXEMPLARY EMBODIMENTS

Embodiments

Hereinafter, preferred embodiments of the invention will be described in detail with reference to the accompanying drawings. Moreover, in the following drawings, the scale of each member is adjusted in order that each member has a recognizable size. In addition, the present embodiment to be described below does not unduly limit the contents of the invention as defined in the appended claims, and all constituent components described in the present embodiment are not necessarily indispensable as solving means of the invention.

In addition, in the following explanation, it is assumed that axes crossing each other are an X axis, a Y axis, and a Z axis and the emission direction of detection light is a Z-axis direction. Moreover, in drawings referred to below, it is assumed that one and the other sides of the X-axis direction are X1 and X2 sides, respectively, and one and the other sides of the Y-axis direction are Y1 and Y2 sides, respectively.

Overall Configuration

Figure 1A:
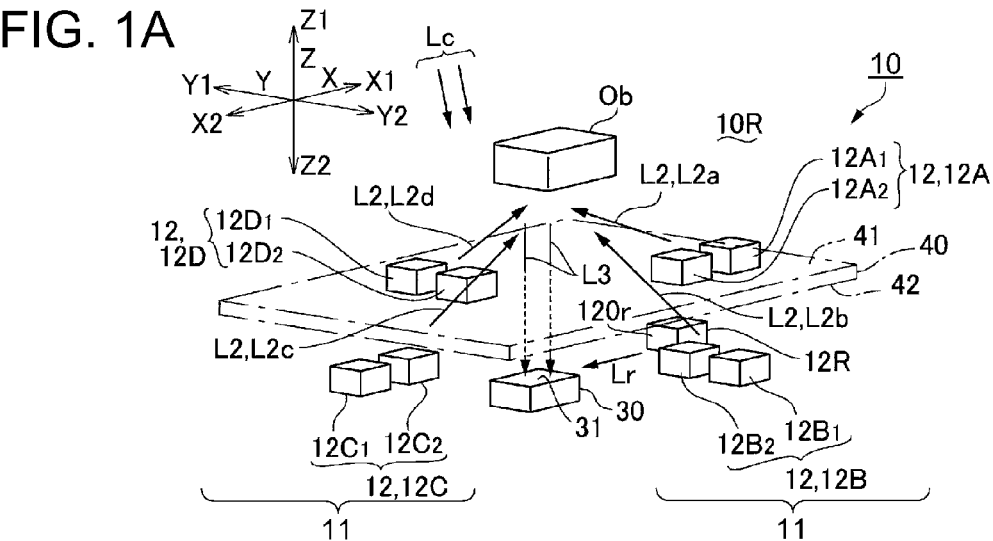
FIG. 1A is a schematic view showing the three-dimensional arrangement of constituent components of an optical position detection device according to an embodiment.
Figure 1B:
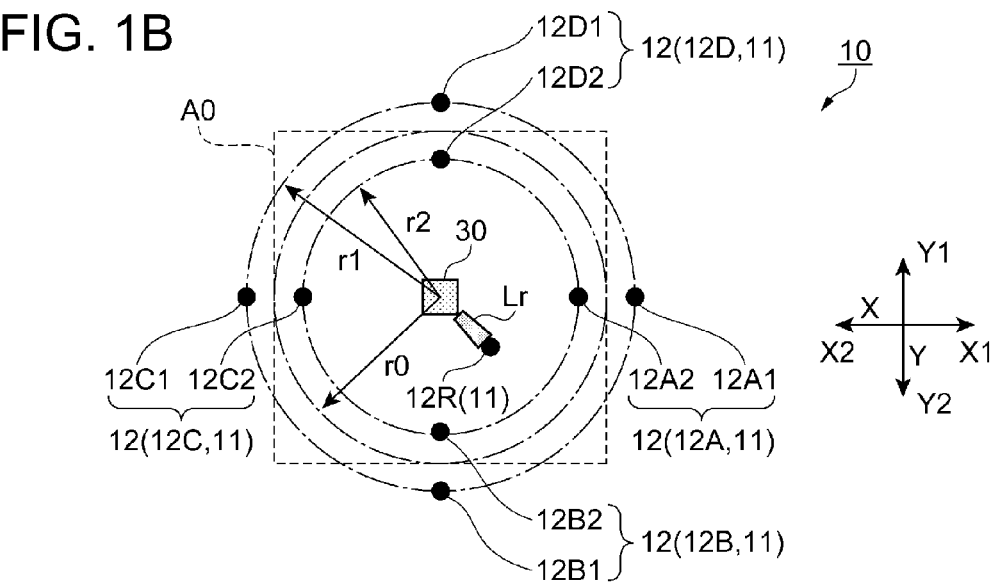
FIG. 1B is a schematic view showing the planar arrangement of constituent components of the optical position detection device according to an embodiment.
Figure 1C:
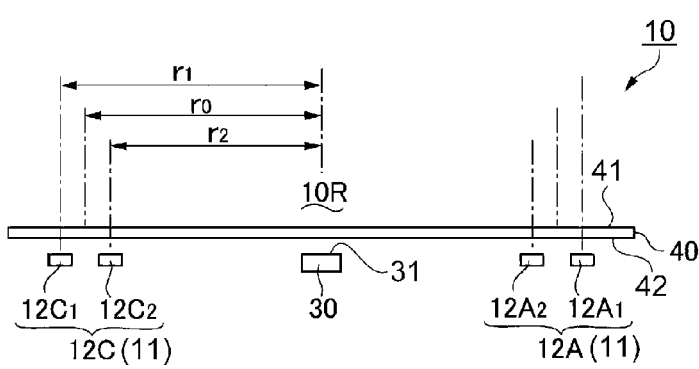
FIG. 1C is a schematic view when the constituent components of the optical position detection device are seen from the side.
Figure 2:
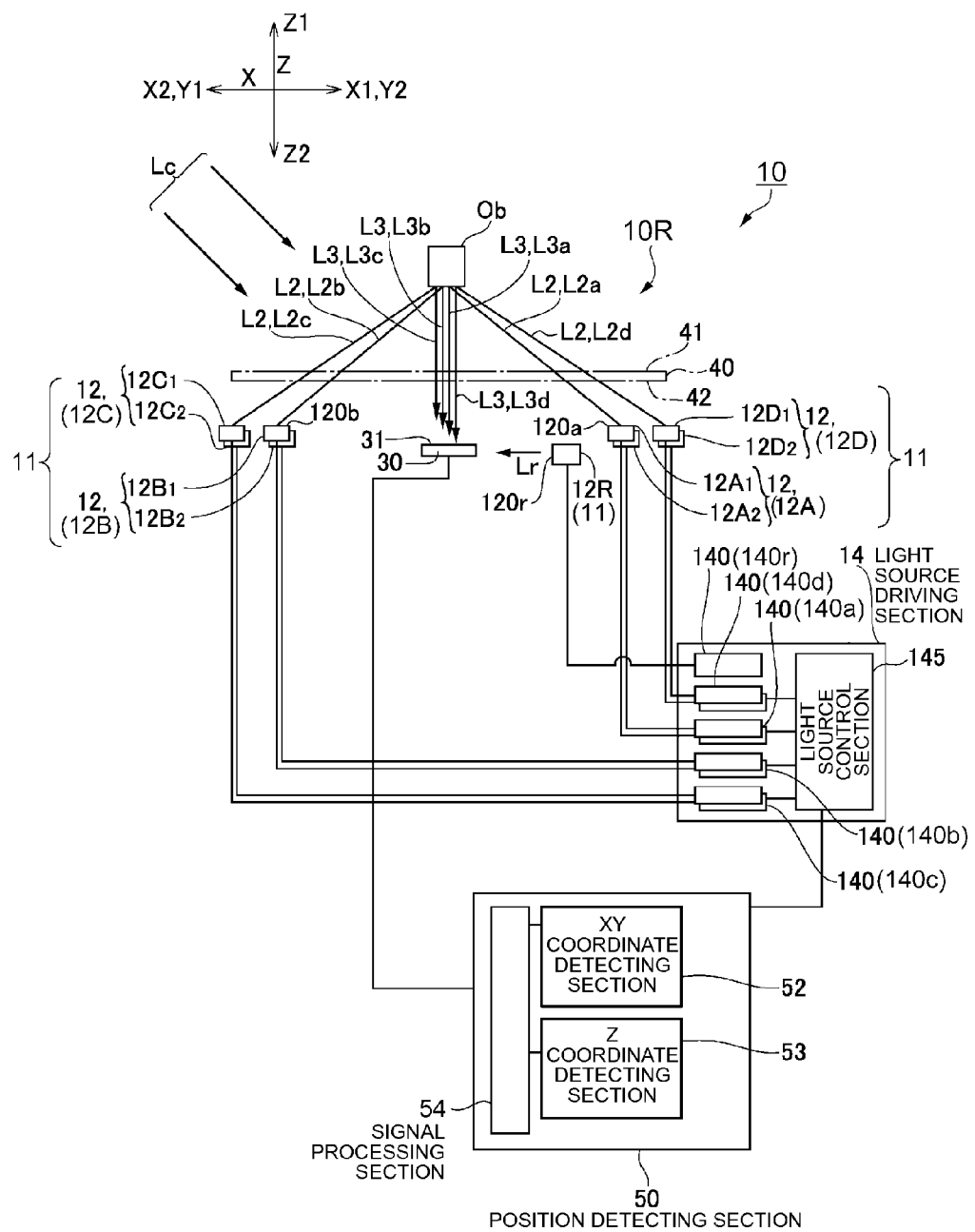
FIG. 2 is a schematic view for explaining the overall configuration of the optical position detection device.

FIGS. 1A to 1c are schematic views for explaining main sections of an optical position detection device. FIG. 1A is a schematic view showing the three-dimensional arrangement of constituent components of the optical position detection device, FIG. 1B is a schematic view showing the planar arrangement of constituent components of the optical position detection device, and FIG. 1C is a schematic view when the constituent components of the optical position detection device are seen from the side. FIG. 2 is a schematic view for explaining the overall configuration of the optical position detection device.

Referring to FIGS. 1A to 2, an optical position detection device 10 according to the present embodiment is an optical device used as a tactile sensor in a robot hand device and the like. The optical position detection device 10 includes a light source device 11, which includes a plurality of light source sections for detection 12 that emit detection light L2 toward the one side Z1 of the Z-axis direction, and a light detecting section 30 which detects detection light L3 reflected from the target object Ob. In addition, the optical position detection device 10 may include a sheet-like or plate-shaped light transmissive member 40. In this case, the light source section for detection 12 emits the detection light L2 from the second surface 42 side of the light transmissive member 40, which is an opposite side of the first surface 41 side, to the first surface 41 side, and the light detecting section 30 detects the detection light L3 which is reflected from the target object Ob and is then transmitted to the second surface 42 side of the light transmissive member 40. For this reason, a light receiving section 31 of the light detecting section 30 faces the second surface 42 of the light transmissive member 40.

In the present embodiment, the light source device 11 includes a first light source section for detection 12A, a second light source section for detection 12B, a third light source section for detection 12C, and a fourth light source section for detection 12D as the plurality of light source sections for detection 12. Each of the light source sections for detection 12 has a light emitting section, and the light emitting section faces the light transmissive member 40. Then, the plurality of light source sections for detection 12 are turned on simultaneously or sequentially, and the detection light L3 reflected from the target object Ob travels toward the light detecting section 30. Accordingly, the detection light L2 emitted from the light source section for detection 12 is transmitted through the light transmissive member 40 and is emitted to the first surface 41 side (emission side space of the detection light L2 from the light source device 11). The emission side space is a space at the first surface 41 side of the light transmissive member 40. The emission side space is a detection space 10R where the position of the target object Ob is detected.

The first to fourth light source sections for detection 12A to 12D are disposed in this order on a concentric circle, which has the center of the light detecting section 30 as its center, when seen from the detection space 10R (Z-axis direction). Accordingly, the light detecting section 30 is located inward from the plurality of light source sections for detection 12. In the plurality of light source sections for detection 12A to 12D, the first and third light source sections for detection 12A and 12C are separated from each other in the X-axis direction, and the second and fourth light source sections for detection 12B and 12D are separated from each other in the Y-axis direction.

In addition, when seen from the first and third light source sections for detection 12A and 12C, the second and fourth light source sections for detection 12B and 12D are separated from the first light source section for detection 12A in the X-axis direction. Similarly, when seen from the second and fourth light source sections for detection 12B and 12D, the first and third light source sections for detection 12A and 12C are separated from the second light source section for detection 12B in the Y-axis direction.

In addition, when seen from the detection space 10R (Z-axis direction), the first to fourth light source sections for detection 12A to 12D are disposed at equal angular intervals around the center of the light detecting section 30. In addition, when seen from the detection space 10R (Z-axis direction), distances from the light detecting section 30 to the first to fourth light source sections for detection 12A to 12D are equal.

In addition, the light source device 11 includes a reference light source 12R with a light emitting section 120r facing the light detecting section 30. The reference light source 12R is an LED (light emitting diode), for example, and emits reference light Lr as divergent light. However, the reference light Lr is not incident on the first surface 41 side (detection space 10R) of the light transmissive member 40 due to the direction of the reference light source 12R, a light shielding cover (not shown) provided in the reference light source 12R, or the like, and is incident on the light detecting section 30 without passing through the detection space 10R. In the present embodiment, the reference light source 12R emits the reference light Lr, which is infrared light with a peak wavelength of 840 to 1000 nm, as divergent light.

For example, the light detecting section 30 is a photodiode or a phototransistor with the light receiving section 31 facing the light transmissive member 40. In the present embodiment, the light detecting section 30 is a photodiode with a sensitivity peak in an infrared region.

Detailed Configuration of the Light Source Section for Detection

As shown in FIG. 1B, each of the plurality of light source sections for detection 12 includes two light emitting elements arrayed in the radial direction of the circle having the light detecting section 30 as its center. More specifically, first, the first light source section for detection 12A includes a first light emitting element 12A1 as a first light emitting element for detection and a second light emitting element 12A2 located closer to the light detecting section 30 than the first light emitting element 12A1 (located inward from the first light emitting element 12A1). The first and second light emitting elements 12A1 and 12A2 and the light detecting section 30 are disposed on the same straight line. Moreover, similar to the first light source section for detection 12A, the second light source section for detection 12B includes a first light emitting element 12B1 and a second light emitting element 12B2 located closer to the light detecting section 30 than the first light emitting element 12B1 (located inward from the first light emitting element 12B1). The first and second light emitting elements 12B1 and 12B2 and the light detecting section 30 are disposed on the same straight line.

Similar to the first light source section for detection 12A, the third light source section for detection 12C includes a first light emitting element 12C1 as a second light emitting element for detection and a second light emitting element 12C2 as a third light emitting element for detection located closer to the light detecting section 30 than the first light emitting element 12C1 (located inward from the first light emitting element 12C1). In addition, the first and second light emitting elements 12C1 and 12C2 and the light detecting section 30 are disposed on the same straight line. Moreover, similar to the first light source section for detection 12A, the fourth light source section for detection 12D includes a first light emitting element 12D1 and a second light emitting element 12D2 located closer to the light detecting section 30 than the first light emitting element 12D1 (located inward from the first light emitting element 12D1). The first and second light emitting elements 12D1 and 12D2 and the light detecting section 30 are disposed on the same straight line.

Here, all of the first light emitting elements 12A1 to 12D1 are located on the circumference of radius r1 with the light detecting section 30 as its center, and all of the second light emitting elements 12A2 to 12D2 are located on the circumference of radius r2 with the light detecting section 30 as its center (r1>r2). In addition, a circle of radius r0 (r0=(r1+r2)/2) located in the middle of the circle of radius r1 and the circle of radius r2 is also shown in FIG. 1B. In addition, a rectangular region A0 surrounded by the straight line which touches the circle of radius r0 and passes through the midpoint of the first and second light emitting elements 12A1 and 12A2, the straight line which touches the circle of radius r0 and passes through the midpoint of the first and second light emitting elements 12B1 and 12B2, the straight line which touches the circle of radius r0 and passes through the midpoint of the first and second light emitting elements 12C1 and 12C2, and the straight line which touches the circle of radius r0 and passes through the midpoint of the first and second light emitting elements 12D1 and 12D2 is also shown in FIG. 1B.

Here, each of the first light emitting elements 12A1 to 12D1 and the second light emitting elements 12A2 to 12D2 is formed as a light emitting element, such as an LED (light emitting diode), and emits the detection light L2 (detection light L2a to L2d), which is infrared light with a peak wavelength of 840 to 1000 nm, as divergent light.

Configuration of a Position Detecting Section and the Like

As shown in FIG. 2, the light source device 11 includes a light source driving section 14 which drives the plurality of light source sections for detection 12. The light source driving section 14 includes a light source driving circuit 140, which drives the light source section for detection 12 and the reference light source 12R, and a light source control section 145, which controls a lighting pattern of each of the plurality of light source sections for detection 12 and the reference light source 12R through the light source driving circuit 140. The light source driving circuit 140 includes light source driving circuits 140a to 140d which drive the first to fourth light source sections for detection 12A to 12D, respectively, and a light source driving circuit 140r which drives the reference light source 12R. In addition, each of the light source driving circuits 140a to 140d drives separately the first light emitting elements 12A1 to 12D1 and the second light emitting elements 12A2 to 12D2. The light source control section 145 controls all of the light source driving circuits 140a to 140d and 140r. Moreover, for the light source driving circuits 140a to 140d, it is possible to adopt a configuration in which the first light emitting elements 12A1 to 12D1 and the second light emitting elements 12A2 to 12D2 are driven by a switching circuit. In this case, only one light source driving circuit 140 is provided.

A position detecting section 50 is electrically connected to the light detecting section 30, and a detection result of the light detecting section 30 is output to the position detecting section 50. The position detecting section 50 includes a signal processing section 54 for calculating the position of the target object Ob on the basis of a detection result of the light detecting section 30, and the signal processing section 54 includes an amplifier, a comparator, and the like. In addition, the position detecting section 50 includes an XY coordinate detecting section 52 which detects the XY coordinates of the target object Ob and a Z coordinate detecting section 53 which detects the Z coordinate of the target object Ob. The position detecting section 50 and the light source driving section 14 configured in this way operate in a state interlocked with each other to perform position detection, which will be described later. Then, the position detecting section 50 detects the position of the target object Ob in the emission direction of the detection light L3 on the basis of a light receiving result of the light detecting section 30 when the plurality of light source sections for detection 12 are turned on simultaneously or sequentially.

Principle of Internal and External Position Detection

FIGS. 3A to 3E are schematic views for explaining the principle of detecting the internal and external positions of a target object. As shown in FIGS. 3A to 3E, the first light emitting element 12A1, the light detecting section 30, and the first and second light emitting elements 12C1 and 12C2 are disposed on the same straight line. In the optical position detection device 10, the position detecting section 50 drives the light source driving section 14 so that the difference between the light source sections for detection 12 is obtained, as will be described later with reference to FIGS. 4A to 5B. Alternatively, the relationship of the distance between one of the two light source sections for detection 12 and the target object Ob and the distance between the other light source section for detection 12 and the target object Ob is calculated by making the position detecting section 50 drive the light source driving section 14 so that the difference between the light source section for detection 12 and the reference light source 12R is obtained, and the position of the target object Ob is detected on the basis of this relationship. In the present embodiment, the relationship between one distance and the other distance is assumed to be a distance ratio. Although either the first light emitting elements 12A1 to 12D1 or the second light emitting elements 12A2 to 12D2 may be used in such driving, a case where the first light emitting elements 12A1 to 12D1 are used will be exemplified in the following explanation.

Figure 3A:
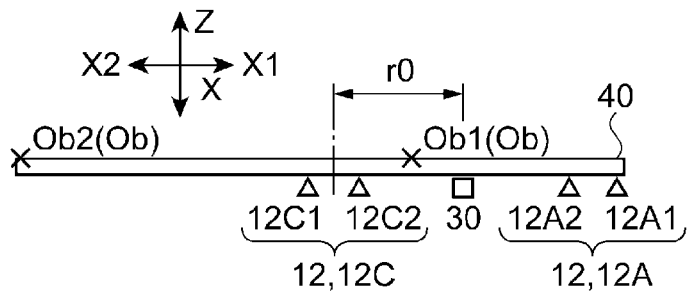
FIGS. 3A to 3E are schematic views for explaining the principle of detecting the internal and external positions of a target object.

Moreover, in the present embodiment, the ratio of the distance between one of the two light source sections for detection 12 and the target object Ob and the distance between the other light source section for detection 12 and the target object Ob is calculated by making the position detecting section 50 drive the light source driving section 14 so that the difference between the two light source sections for detection 12 is obtained. Then, as shown in FIG. 3A, position detection is performed without distinction between the case where the target object Ob is located inside a region between the two light source sections for detection 12 like the target object Ob1 and the case where the target object Ob is located outside the region between the two light source sections for detection 12 like the target object Ob2.

Hereinafter, for the position detection method in both the case where the target object is located inside a region between light source sections for detection and the case where the target object is located outside the region, an example of the case will be described in which position detection is performed without distinction between the case where the target object Ob is located inward from the third light source section for detection 12C and the case where the target object Ob is located outward from the third light source section for detection when the coordinate of the target object Ob is detected. In the present embodiment, first, the position detecting section 50 drives the light source driving section 14 so that the difference between the first light emitting elements 12A1 and 12C1 is obtained. Alternatively, by driving the light source driving section 14 so that the difference between the first light emitting elements 12A1 and 12C1 and the reference light source 12R is obtained, the ratio of the distance between the first light emitting element 12A1 and the target object Ob and the distance between the first light emitting element 12C1 and the target object Ob is calculated.

In addition, before the distance ratio is calculated or after the distance ratio is calculated, the light source driving section 14 is driven so that the difference between the first light emitting elements 12A1 and 12C1 is obtained. Alternatively, the light source driving section 14 is driven so that the difference between the first light emitting elements 12A1 and 12C1 and the reference light source 12R is obtained. Thus, the ratio of the distance between the first light emitting element 12A1 and the target object Ob and the distance between the first light emitting element 12C1 and the target object Ob is calculated. The received light intensity in the light detecting section 30 when the first light emitting element 12C1 is turned on is compared with the received light intensity in the light detecting section 30 when the second light emitting element 12C2 is turned on, and the position is detected on the basis of this comparison result without distinction between the case where the target object Ob is located outward from the third light source section for detection 12C and the case where the target object Ob is located inward from the third light source section for detection 12C.

Figure 3B:
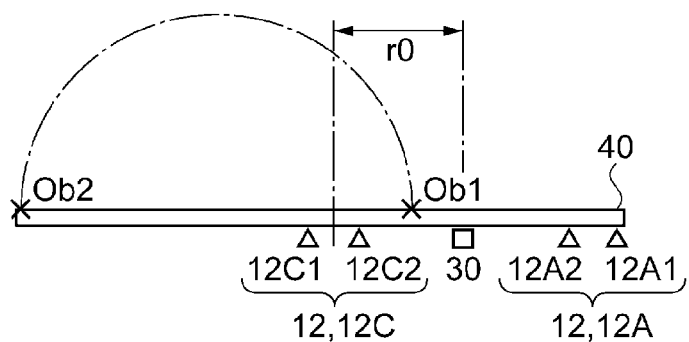

More specifically, the case where the target object Ob is located inward from the third light source section for detection 12C as shown in FIG. 3B will be described. When the ratio of the distance between the first light emitting element 12A1 of the first light source section for detection 12A and the target object Ob and the distance between the first light emitting element 12C1 of the third light source section for detection 12C and the target object Ob is a predetermined value, the position where the target object Ob is present is an elliptical arc passing through points Ob1 and Ob2. Here, the point Ob1 is obtained by dividing internally the line segment, which connects the first light emitting elements 12A1 and 12C1 to each other, by the ratio, and the point Ob2 is obtained by dividing externally the line segment, which connects the first light emitting elements 12A1 and 12C1 to each other, by the ratio. These points Ob1 and Ob2 are equivalent to the first detection position.

Figure 3C:
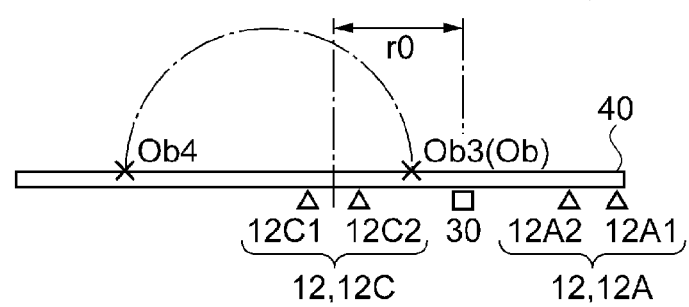
Figure 3D:
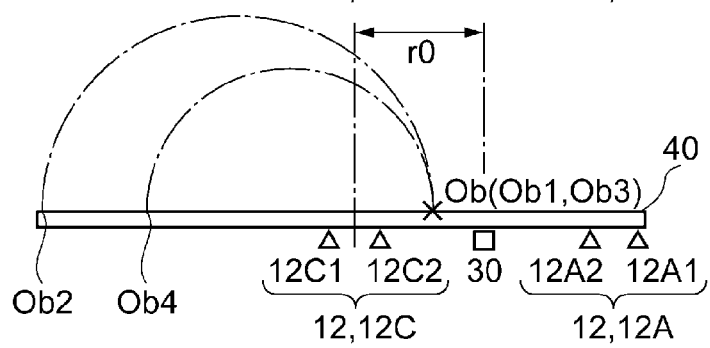

Here, as shown in FIG. 3C, when the ratio of the distance between the first light emitting element 12A1 of the first light source section for detection 12A and the target object Ob and the distance between the second light emitting element 12C2 of the third light source section for detection 12C and the target object Ob is a predetermined value, the position where the target object Ob is present is an elliptical arc passing through points Ob3 and Ob4. Here, the point Ob3 is obtained by dividing internally the line segment, which connects the first and second light emitting elements 12A1 and 12C2 to each other, by the ratio, and the point Ob4 is obtained by dividing externally the line segment, which connects the first and second light emitting elements 12A1 and 12C2 to each other, by the ratio. These points Ob3 and Ob4 are equivalent to the second detection position. Accordingly, as shown in FIG. 3D, the position of the target object Ob becomes the intersection of the two elliptical arcs, and therefore the positions of the internally divided points Ob1 and Ob3 can be calculated to match each other.

Figure 3E:
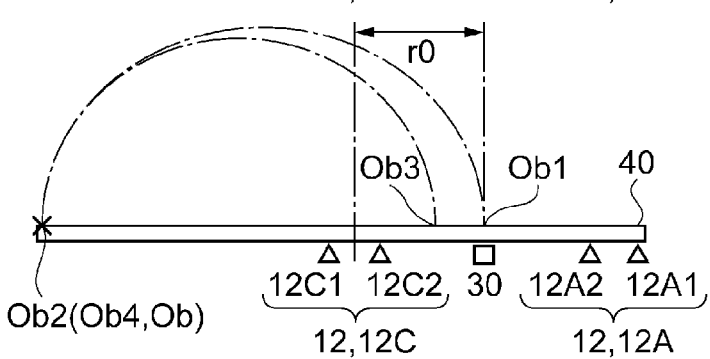

On the other hand, when the target object Ob is located outward from the third light source section for detection 12C as shown in FIG. 3E, assuming that the ratio of the distance between the first light emitting element 12A1 and the target object Ob and the distance between the first light emitting element 12C1 and the target object Ob is a predetermined value, the position where the target object Ob is present is an elliptical arc passing through points Ob1 and Ob2. Here, the point Ob1 is obtained by dividing internally the line segment, which connects the first light emitting elements 12A1 and 12C1 to each other, by the ratio, and the point Ob2 is obtained by dividing externally the line segment, which connects the first light emitting elements 12A1 and 12C1 to each other, by the ratio.

Similarly, when the ratio of the distance between the first light emitting element 12A1 and the target object Ob and the distance between the second light emitting element 12C2 and the target object Ob is a predetermined value, the position where the target object Ob is present is an elliptical arc passing through the points Ob3 and Ob4. Here, the point Ob3 is obtained by dividing internally the line segment, which connects the first and second light emitting elements 12A1 and 12C2 to each other, by the ratio, and the point Ob4 is obtained by dividing externally the line segment, which connects the first and second light emitting elements 12A1 and 12C2 to each other, by the ratio. When the target object Ob is located outside, the position of the target object Ob becomes an intersection of the two elliptical arcs since the positions of the externally divided points Ob2 and Ob4 match each other. Therefore, the position of the target object Ob becomes the externally divided point Ob2 and the externally divided point Ob4.

According to this method, the position of the target object Ob can be detected in both the case where the target object Ob is located inside the region A0 surrounded by the straight lines passing through the positions, which are apart from the light detecting section 30 by the distance r0, and the case where the target object Ob is located outside the region A0. That is, the target object Ob is detected by the first light emitting elements 12A1 and 12C1, and then the target object Ob is detected by the first and second light emitting elements 12A1 and 12C2. Then, the position of the target object Ob can be correctly checked by turning on the first and second light emitting elements 12C1 and 12C2 alternately.

Moreover, in the present embodiment, the above-described internal and external position detection is performed in the first to fourth light source sections for detection 12A to 12D. For this reason, even if the target object Ob is located in the angular direction crossing the X-axis direction and the Y-axis direction, the position can be detected in both the case where the target object Ob is located inward from the first to fourth light source sections for detection 12A to 12D and the case where the target object Ob is located outward from the first to fourth light source sections for detection 12A to 12D. As a result, the XY coordinates indicating the position of the target object Ob can be detected with high precision.

Basic Coordinate Detection Principle

Figure 4A:
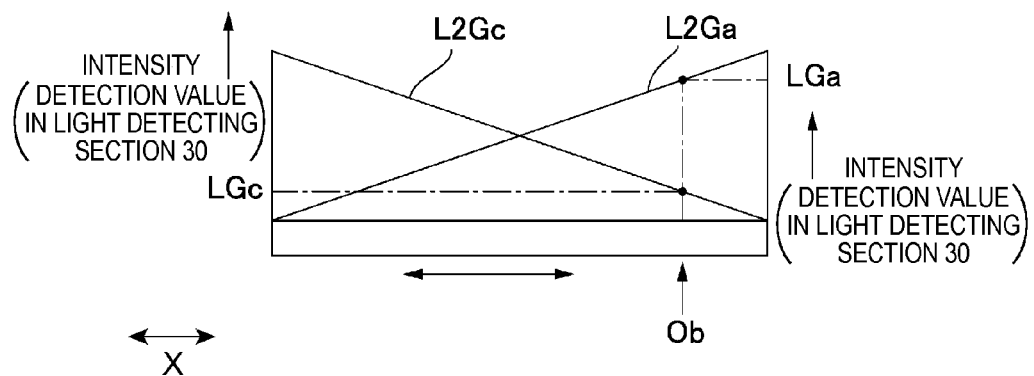
FIG. 4A is a schematic view for explaining the relationship between the position of a target object and the received light intensity in a light detecting section.
Figure 4B:
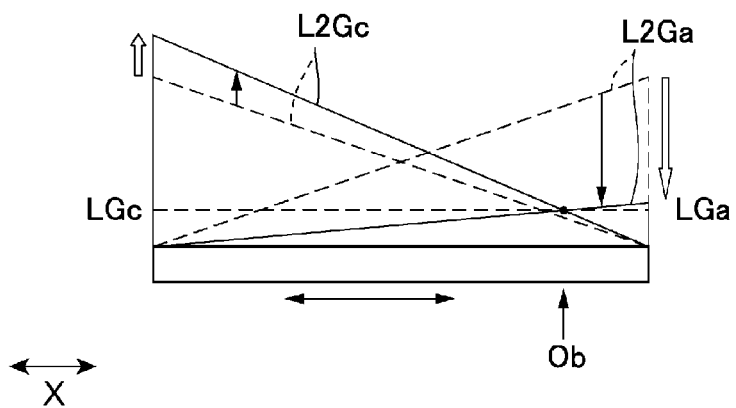
FIG. 4B is a schematic view for explaining the situation where the emission intensity of detection light is adjusted so that the received light intensity in the light detecting section becomes equal.

FIGS. 4A and 4B are schematic views for explaining the basic principle of coordinate detection. FIG. 4A is a schematic view for explaining the relationship between the position of a target object and the received light intensity in the light detecting section, and FIG. 4B is a schematic view for explaining the situation where the emission intensity of detection light is adjusted so that the received light intensity in the light detecting section becomes equal.

In the optical position detection device 10 according to the present embodiment, the position detecting section 50 drives the light source driving section 14 so that the difference between the light source sections for detection 12 is obtained, as will be described below with reference to FIGS. 4A to 5B. Alternatively, the ratio of the distance between one of the two light source sections for detection 12 and the target object Ob and the distance between the other light source section for detection 12 and the target object Ob is calculated by making the position detecting section 50 drive the light source driving section 14 so that the difference between the light source section for detection 12 and the reference light source 12R is obtained, and the position of the target object Ob is detected on the basis of the distance ratio.

Hereinafter, the basic principle will be described when detecting the X and Y coordinates of the target object Ob from a plurality of results obtained by driving the first to fourth light source sections for detection 12A to 12D while changing the combination of two of the first to fourth light source sections for detection 12A to 12D on the basis of a light receiving result of the light detecting section 30 so that the difference between the two light source sections for detection is obtained.

In the optical position detection device 10 according to the present embodiment, the detection space 10R is set at the first surface 41 side of the light transmissive member 40 (space at the emission side of the detection light L2 from the light source device 11). In addition, the two light source sections for detection 12, for example, the first and third light source sections for detection 12A and 12C are separated from each other in the X-axis direction. For this reason, when the first light emitting element 12A1 of the first light source section for detection 12A is turned on to emit the detection light L2a, the detection light L2a forms first light intensity distribution L2Ga in which the intensity decreases monotonically from one side toward the other side, as shown in FIG. 4A. In addition, when the first light emitting element 12C1 of the third light source section for detection 12C is turned on to emit detection light L2c, the detection light L2c is transmitted through the light transmissive member 40 to form second light intensity distribution L2Gc, in which the intensity increases monotonically from one side toward the other side, at the first surface 41 side (detection space 10R).

The position information of the target object Ob is acquired by driving the light source section for detection 12 so that the difference between the light intensity distribution of the detection light L2a and the light intensity distribution of the detection light L2c is obtained. First, the first light emitting element 12A1 of the first light source section for detection 12A is turned on, while the first light emitting element 12C1 of the third light source section for detection 12C is turned off. Accordingly, the first light intensity distribution L2Ga in which the intensity decreases monotonically from one side toward the other side is formed.

Then, the first light emitting element 12A1 of the first light source section for detection 12A is turned off, while the first light emitting element 12C1 of the third light source section for detection 12C is turned on. Accordingly, the second light intensity distribution L2Gc in which the intensity increases monotonically from one side toward the other side is formed. Therefore, when the target object Ob is disposed in the detection space 10R, the detection light L2 is reflected by the target object Ob and some of the reflected light beams are detected by the light detecting section 30. In this case, the intensity of light reflected from the target object Ob is proportional to the intensity of the detection light L2 at the place where the target object Ob is located, and the received light intensity in the light detecting section 30 is proportional to the intensity of light reflected from the target object Ob. Therefore, the received light intensity in the light detecting section 30 is a value corresponding to the position of the target object Ob.

As shown in FIG. 4B, the position detecting section 50 adjusts the amount of control (driving current) for the first light emitting element 12A1 of the first light source section for detection 12A so that the detection value LGa in the light detecting section 30 when forming the first light intensity distribution L2Ga and the detection value LGc in the light detecting section 30 when forming the second light intensity distribution L2Gc become equal. The position of the target object Ob on the X axis is detected using the ratio of the driving current when this adjustment is performed and the driving current when the amount of control (driving current) for the first light emitting element 12C1 of the third light source section for detection 12C is adjusted or the ratio of the amounts of adjustment. That is, it is possible to detect at which position between the first light emitting element 12A1 of the first light source section for detection 12A and the first light emitting element 12C1 of the third light source section for detection 12C on the X axis the target object Ob is present.

More specifically, as shown in FIG. 4A, a light intensity distribution is formed such that the first light intensity distribution L2Ga and the second light intensity distribution L2Gc become opposite directions in the X-axis direction. If the detection values LGa and LGc in the light detecting section 30 are equal in this state, it can be seen that the target object Ob is located in the middle between the first light emitting element 12A1 of the first light source section for detection 12A and the first light emitting element 12C1 of the third light source section for detection 12C within the XY plane.

In contrast, when the detection values LGa and LGc in the light detecting section 30 are different, the amount of control (driving current) for the first light emitting element 12A1 of the first light source section for detection 12A and the first light emitting element 12C1 of the third light source section for detection 12C is adjusted so that the detection values LGa and LGc become equal. In addition, as shown in FIG. 4B, the first light intensity distribution L2Ga and the second light intensity distribution L2Gc are sequentially formed again. As a result, if the detection values LGa and LGc in the light detecting section 30 become equal, the ratio of the driving current for the first light emitting element 12A1 of the first light source section for detection 12A and the driving current for the first light emitting element 12C1 of the third light source section for detection 12C at this point of time is used. Using the ratio of the driving currents, it is possible to detect at which position between the first light emitting element 12A1 of the first light source section for detection 12A and the first light emitting element 12C1 of the third light source section for detection 12C on the X axis the target object Ob is present.

Such detection principle will be mathematically described below using an optical path function. First, in the driving for obtaining the difference described above, the driving current for the first light emitting element 12A1 of the first light source section for detection 12A when the received light intensity in the light detecting section 30 becomes equal is set to IA. The driving current for the first light emitting element 12C1 of the third light source section for detection 12C is set to IC. The ratio of a function of the distance from the first light emitting element 12A1 of the first light source section for detection 12A to the light detecting section 30 through the target object Ob and a function of the distance from the first light emitting element 12C1 of the third light source section for detection 12C to the light detecting section 30 through the target object Ob is set to PAC. Basically, the ratio PAC is calculated by Expression (0) shown below.

$$PAC=IC/IA \qquad (0)$$

Accordingly, it can be seen that the target object Obis located on the geometric line passing through the position obtained by dividing the line, which connects the first light emitting element 12A1 of the first light source section for detection 12A and the first light emitting element 12C1 of the third light source section for detection 12C to each other, by the predetermined ratio.

This model will be mathematically described. First, each parameter is defined as follows.

T=reflectance of the target object Ob
At=function of the distance until the detection light L2 emitted from the first light emitting element 12A1 of the first light source section for detection 12A reaches the light detecting section 30 after being reflected from the target object Ob
A=detection intensity of the light detecting section 30 when the first light emitting element 12A1 of the first light source section for detection 12A is turned on in a state where the target object Ob is present in the detection space 10R
Ct=function of the distance until the detection light L2 emitted from the first light emitting element 12C1 of the third light source section for detection 12C reaches the light detecting section 30 after being reflected from the target object Ob
C=detection intensity of the light detecting section 30 when the first light emitting element 12C1 of the third light source section for detection 12C is turned on in a state where the target object Ob is present in the detection space 10R In addition, the emission intensity of the first light emitting element 12A1 of the first light source section for detection 12A and the emission intensity of the first light emitting element 12C1 of the third light source section for detection 12C are expressed as a product of the driving current and the emission coefficient, and the emission coefficient is set to 1 in the following explanation.

In addition, the following relationship is satisfied when driving for obtaining the difference described above in a state where the target object Ob is present in the detection space 10R is performed.

$$A=T\times At\times IA+\text{ambient light} \qquad (1)$$

$$C=T\times Ct\times IC+\text{ambient light} \qquad (2)$$

Here, since the detection intensity of the light detecting section 30 when performing driving for obtaining the difference is equal, the following Expression is derived from Expressions (1) and (2).

$$T\times At\times IA+\text{ambient light}=T\times Ct\times IC+\text{ambient light}$$

$$T\times At\times IA=T\times Ct\times IC \qquad \text{Expression (3)}$$

In addition, the ratio PAC of the distance functions At and Ct is defined by the following Expression (4).

$$PAC=At/Ct \qquad (4)$$

From Expressions (3) and (4), the ratio PAC of the distance functions is expressed by the following Expression (5).

$$PAC=IC/IA \qquad (5)$$

In this Expression (5), terms of ambient light and the reflectance of the target object Ob are not present. Therefore, the ratio PAC of the optical path coefficients At and Ct are not influenced by ambient light and the reflectance of the target object Ob. Moreover, for the above mathematical model, it is also possible to perform correction for offsetting the influence of the detection light L2 which is incident without being reflected by the target object Ob.

Here, the light source used in the light source section for detection 12 is a point light source, and the light intensity at a certain point varies inversely with the square of the distance from the light source. Therefore, the ratio of a distance P1 between the first light emitting element 12A1 of the first light source section for detection 12A and the target object Ob and a distance P2 between the first light emitting element 12C1 of the third light source section for detection 12C and the target object Ob is calculated from the following Expression.

$$PAC=(P2)^2/(P1)^2$$

Accordingly, it can be seen that the target object Ob is present on the geometric line passing through the position obtained by dividing the virtual line, which connects the first light emitting element 12A1 of the first light source section for detection 12A and the first light emitting element 12C1 of the third light source section for detection 12C to each other, by the ratio of P1:P2.

Similarly, if the ratio of the distance between the first light emitting element 12B1 and the target object Ob and the distance between the first light emitting element 12D1 and the target object Ob is calculated by driving the first light emitting elements 12B1 and 12D1 so that the difference therebetween is obtained, it can be seen that the target object Ob is present on the geometric line passing through the position obtained by dividing the virtual line, which connects the first light emitting elements 12B1 and 12D1 to each other, by the predetermined ratio. As a result, the X and Y coordinates of the target object Ob can be detected. Moreover, in the above method, the principle adopted in the present embodiment has been described geometrically. In practice, however, the above calculation is performed using the obtained data.

When detecting the X and Y coordinates in this way, if the position detection described with reference to FIGS. 3A to 3E is performed, appropriate division in both the case where the target object Ob is located inside a region between the first to fourth light source sections for detection 12A to 12D and the case where the target object Ob is located outside the region between the first to fourth light source sections for detection 12A to 12D can be performed when dividing the virtual line connecting the first light emitting elements 12A1 and 12C1 to each other and when dividing the virtual line connecting the first light emitting elements 12B1 and 12D1 to each other. Therefore, the X and Y coordinates of the target object Ob can be accurately detected.

Driving for Obtaining the Difference Between the Reference Light Lr and the Detection Light L2

Figure 5A:
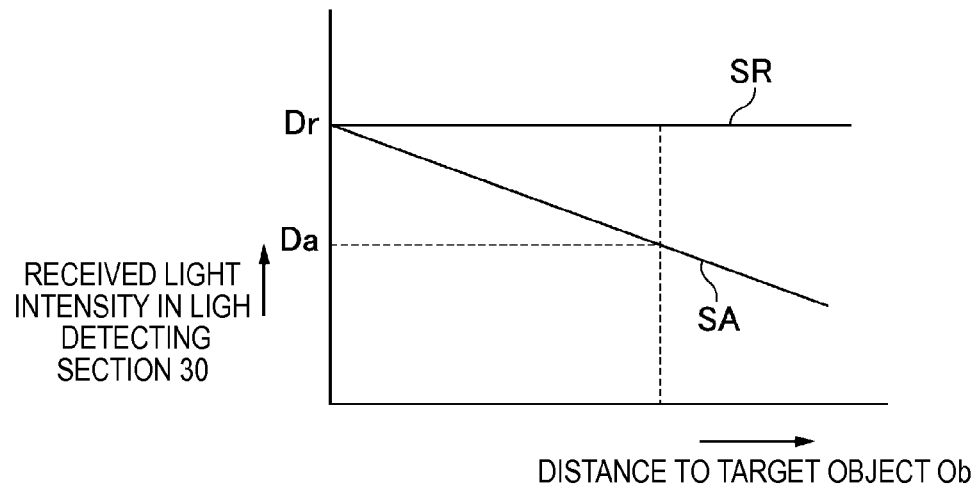
Figure 5B:
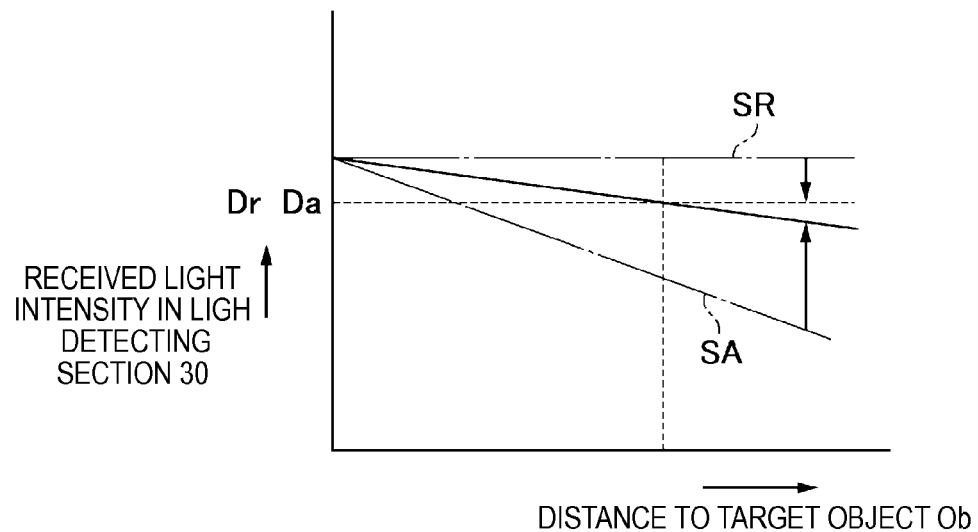
FIG. 5B is a schematic view for explaining the situation after adjusting a driving current supplied to a light source.

FIGS. 5A and 5B are schematic views for explaining the principle of detecting the position of a target object using driving for obtaining the difference between reference light and detection light. FIG. 5A is a schematic view for explaining the relationship between the distance from a light source section for detection to a target object and the received light intensity of detection light or the like, and FIG. 5B is a schematic view for explaining a situation after adjusting a driving current supplied to a light source.

In the optical position detection device 10 according to the present embodiment, driving for obtaining the direct difference between the detection light L2a and the detection light L2c is performed. Alternatively, the same result as in the principle described with reference to FIGS. 4A and 4B can be eventually derived using driving for obtaining the difference between the detection light L2a and the reference light Lr and driving for obtaining the difference between the detection light L2c and the reference light Lr. In this method, the driving for obtaining the difference between the detection light L2a and the reference light Lr and the driving for obtaining the difference between the detection light L2c and the reference light Lr are executed as follows.

As shown in FIG. 5A, in a state where the target object Ob is present in the detection space 10R, the distance from the first light emitting element 12A1 of the first light source section for detection 12A to the target object Ob and the received light intensity Da of the detection light L2a in the light detecting section 30 change monotonically as shown by the solid line SA. In contrast, the distance between the reference light source 12R and the light detecting section 30 is constant and does not change. Accordingly, the detection intensity in the light detecting section 30 regarding the reference light Lr emitted from the reference light source 12R is constant as shown by the solid line SR regardless of the position of the target object Ob. Therefore, the received light intensity Da of the detection light L2a in the light detecting section 30 and the detection intensity Dr of the reference light Lr in the light detecting section 30 are different.

Then, as shown in FIG. 5B, at least one of the driving current for the first light emitting element 12A1 of the first light source section for detection 12A and the driving current for the reference light source 12R is adjusted, so that the received light intensity Da of the detection light L2a in the light detecting section 30 and the detection intensity Dr of the reference light Lr in the light detecting section 30 become equal. Such driving for obtaining the difference is performed between the reference light Lr and the detection light L2a and between the reference light Lr and the detection light L2c. Accordingly, it is possible to calculate the ratio of the driving current for the first light emitting element 12A1 of the first light source section for detection 12A and the driving current for the first light emitting element 12C1 of the third light source section for detection 12C when a detection result of the detection light L2a and L2c (detection light L3a and L3c reflected from the target object Ob) in the light detecting section 30 and a detection result of the reference light Lr in the light detecting section 30 become equal. Therefore, it is possible to detect at which position between the first and third light source sections for detection 12A and 12C the target object Ob is present.

The above detection principle will be mathematically described below using the optical path function. First, each parameter is defined as follows.

T=reflectance of the target object Ob

At =function of the distance until the detection light L2 emitted from the first light emitting element 12A1 of the first light source section for detection 12A reaches the light detecting section 30 after being reflected from the target object Ob A=detection intensity of the light detecting section 30 when the first light emitting element 12A1 of the first light source section for detection 12A is turned on in a state where the target object Ob is present in the detection space 10R Ct=function of the distance until the detection light L2 emitted from the first light emitting element 12C1 of the third light source section for detection 12C reaches the light detecting section 30 after being reflected from the target object Ob C=detection intensity of the light detecting section 30 when the first light emitting element 12C1 of the third light source section for detection 12C is turned on in a state where the target object Ob is present in the detection space 10R Rs=coefficient of the optical path from the reference light source 12R to the light detecting section 30

R=detection intensity of the light detecting section 30 when only the reference light source 12R is turned on In addition, the emission intensities of the first light emitting element 12A1 of the first light source section for detection 12A, the first light emitting element 12C1 of the third light source section for detection 12C, and the reference light source 12R are expressed as a product of the driving current and the emission coefficient. In the following explanation, the emission coefficient is set to 1 for convenience of explanation. In addition, in the above driving for obtaining the difference, the driving current for the first light emitting element 12A1 of the first light source section for detection 12A, the driving current for the first light emitting element 12C1 of the third light source section for detection 12C, and the driving current for the reference light source 12R when the received light intensity in the light detecting section 30 becomes equal are set to IA, IC, and IR, respectively. Moreover, in the driving for obtaining the difference, the detection intensity of the light detecting section 30 when only the reference light source 12R is turned on is assumed to be the same in driving for obtaining the difference between the first light emitting element 12A1 of the first light source section for detection 12A and the reference light source 12R and driving for obtaining the difference between the first light emitting element 12C1 of the third light source section for detection 12C and the reference light source 12R.

The following relationship is satisfied when driving for obtaining the difference described above in a state where the target object Ob is present in the detection space 10R is performed.

$$A = T \times At \times IA + \text{ambient light} \tag{6}$$

$$C = T \times Ct \times IC + \text{ambient light} \tag{7}$$

$$R = Rs \times IR + \text{ambient light} \tag{8}$$

Here, since the detection intensity of the light detecting section 30 when performing driving for obtaining the difference is equal, the following Expression is derived from Expressions (6) and (8).

$$T \times At \times IA + \text{ambient light} = Rs \times IR + \text{ambient light}$$

$$T \times At \times IA = Rs \times IR$$

$$T \times At = Rs \times IR/IA \tag{Expression 9}$$

From Expressions (7) and (8), the following Expression is derived.

$$T \times Ct \times IC + \text{ambient light} = Rs \times IR + \text{ambient light}$$

$$T \times Ct \times IC = Rs \times IR$$

$$T \times Ct = Rs \times IR/IA \tag{Expression 10}$$

In addition, the ratio PAC of the distance functions At and Ct is expressed by the following Expression.

$$PAC = At/Ct \tag{11}$$

Since the ratio PAC is defined as shown in Expression (11), the ratio PAC of the distance functions is expressed as follows from Expressions (9) and (10).

$$PAC = IC/IA \tag{12}$$

In this Expression (12), terms of ambient light and the reflectance of the target object Ob are not present. Therefore, the ratio PAC of the optical path coefficients At and Ct are not influenced by ambient light and the reflectance of the target object Ob. Moreover, for the above mathematical model, it is also possible to perform correction for offsetting the influence of the detection light L2 which is incident without being reflected by the target object Ob. In addition, even if the detection intensity of the light detecting section 30 when only the reference light source 12R is turned on is set as different values in driving for obtaining the difference between the first light emitting element 12A1 of the first light source section for detection 12A and the reference light source 12R and driving for obtaining the difference between the first light emitting element 12C1 of the third light source section for detection 12C and the reference light source 12R, basically the same principle is satisfied.

Here, the light source used in the light source section for detection 12 is a point light source, and the light intensity at a certain point varies inversely with the square of the distance from the light source. Therefore, the ratio of a distance P1 between the first light emitting element 12A1 of the first light source section for detection 12A and the target object Ob and a distance P2 between the first light emitting element 12C1 of the third light source section for detection 12C and the target object Ob is calculated from the following Expression.

$$PAC = (P2)^2/(P1)^2$$

Accordingly, it can be seen that the target object Ob is located on the geometric line passing through the position obtained by dividing the virtual line, which connects the first light emitting element 12A1 of the first light source section for detection 12A and the first light emitting element 12C1 of the third light source section for detection 12C to each other, by the ratio of P1:P2.

Similarly, if the ratio of the distance between the first light emitting element 12B1 and the target object Ob and the distance between the first light emitting element 12D1 and the target object Ob is calculated using the driving for obtaining the difference between the first light emitting element 12B1 and the reference light source 12R and the driving for obtaining the difference between the first light emitting element 12D1 and the reference light source 12R, it can be seen that the target object Ob is present on the geometric line passing through the position obtained by dividing the virtual line, which connects the first light emitting elements 12B1 and 12D1 to each other, by the predetermined ratio. Therefore, the coordinate of the target object Ob on the X axis can be detected. Moreover, the coordinate of the target object Ob on the Y axis can be detected using the same method.

When detecting the X and Y coordinates in this way, if the position detection described with reference to FIGS. 3A to 3E is performed, appropriate division in both the case where the target object Ob is located inside a region between the first to fourth light source sections for detection 12A to 12D and the case where the target object Ob is located outside the region between the first to fourth light source sections for detection 12A to 12D can be performed when dividing the virtual line connecting the first light emitting elements 12A1 and 12C1 to each other and when dividing the virtual line connecting the first light emitting elements 12B1 and 12D1 to each other. As a result, the X and Y coordinates of the target object Ob can be accurately detected.

Figure 6A:
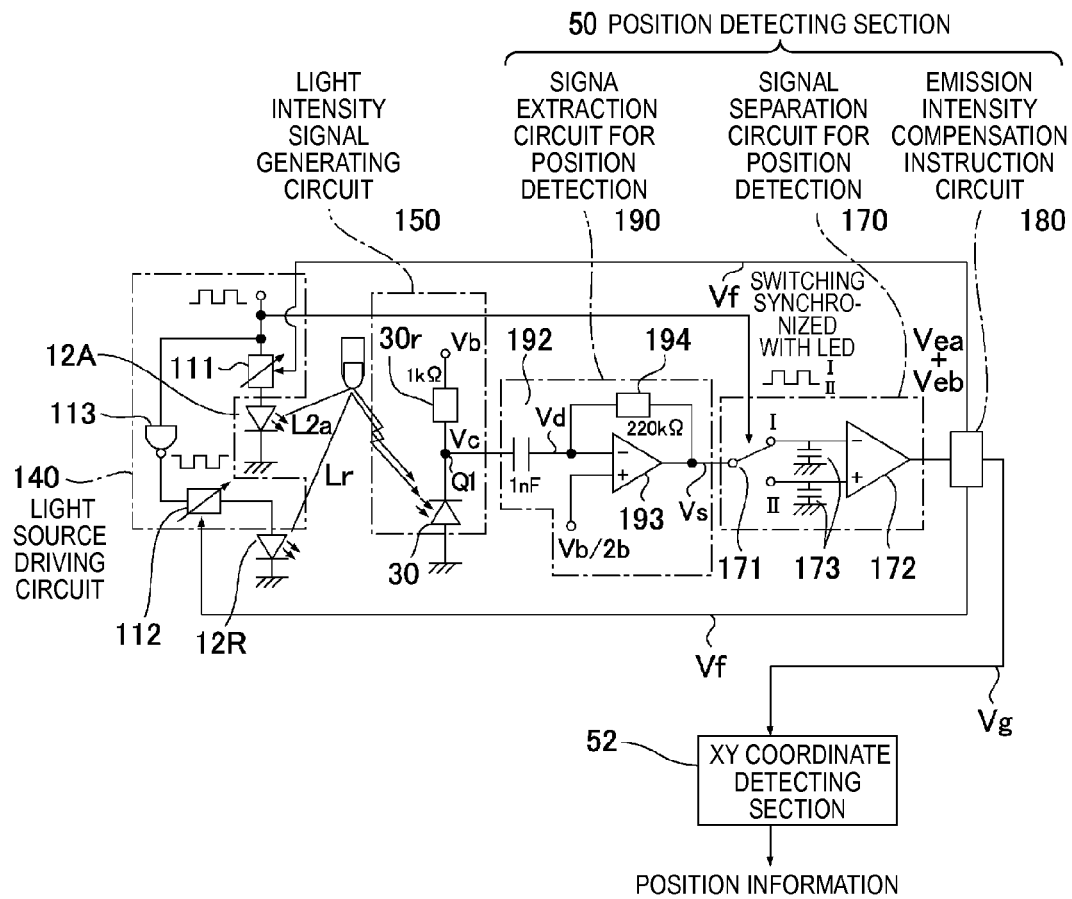
FIG. 6A is a view showing an electric circuit which performs processing executed by the position detecting section.
Figure 6B:
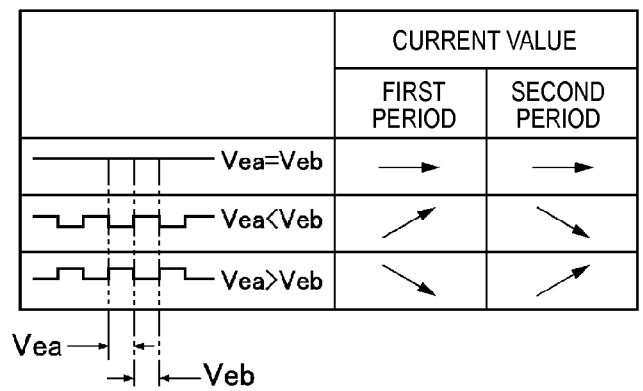
FIG. 6B is a schematic view for explaining an operation of an electric circuit.

Exemplary Configuration of the Position Detecting Section for Driving for Obtaining the Difference FIG. 6A is a view showing an electric circuit which performs processing executed by the position detecting section, and FIG. 6B is a schematic view for explaining an operation of the electric circuit.

In executing the above-described driving for obtaining the difference, it is possible to adopt a configuration in which a microprocessor unit (MPU) is used as the position detecting section 50 and the microprocessor unit executes predetermined software (operation program) for the processing. In addition, it is also possible to adopt a configuration in which a signal processor using hardware, such as a logic circuit, executes the processing. This will be described below with reference to FIG. 6A. In addition, although the driving for obtaining the difference, which has been described with reference to FIGS. 5A and 5B, is shown in FIGS. 6A and 6B, this may also be applied to the driving for obtaining the difference described with reference to FIGS. 4A and 4B if the reference light source 12R is replaced with the second light source section for detection 12B.

As shown in FIG. 6A, in the optical position detection device 10 according to the present embodiment, the light source driving circuit 140 applies a driving pulse with a predetermined current value to the first light source section for detection 12A through a variable resistor 111. On the other hand, a driving pulse with a predetermined current value is applied to the reference light source 12R through a variable resistor 112 and an inverting circuit 113. Accordingly, since driving pulses with opposite phases are applied to the first light source section for detection 12A and the reference light source 12R, the first light source section for detection 12A and the reference light source 12R are turned on alternately.

Then, when the first light source section for detection 12A is turned on, the detection light L2a which is reflected from the target object Ob is received by the light detecting section 30. Then, when the reference light source 12R is turned on, the reference light Lr is received by the light detecting section 30. In a light intensity signal generating circuit 150, a resistor 30r of about 1 kΩ is electrically connected in series to the light detecting section 30, and a bias voltage Vb is applied to both the ends.

In the light intensity signal generating circuit 150, the position detecting section 50 is electrically connected to a connection point Q1 between the light detecting section 30 and the resistor 30r. A detection signal Vc output from the connection point Q1 between the light detecting section and the resistor 30r is expressed by the following Expression.

$$Vc = V30/(V30 + \text{resistance value of resistor } 30r)$$

V30: Equivalent resistance of the light detecting section 30

Therefore, when the case where the ambient light Lc is not incident on the light detecting section 30 is compared with the case where the ambient light Lc is incident on the light detecting section 30, the level and amplitude of the detection signal Vc become large when the ambient light Lc is incident on the light detecting section 30.

In general, the position detecting section 50 is configured to include a signal extraction circuit for position detection 190, a signal separation circuit for position detection 170, and an emission intensity compensation instruction circuit 180. The signal extraction circuit for position detection 190 includes a filter 192 formed by a capacitor of about 1 nF. This filter 192 functions as a high pass filter which removes the DC component from a signal output from the connection point Q1 between the light detecting section 30 and the resistor 30r. Accordingly, due to the filter 192, only the position detection signal Vd of the light detecting section 30 is extracted from the detection signal Vc output from the connection point Q1 between the light detecting section 30 and the resistor 30r. That is, since the intensity of the ambient light Lc can be regarded as being constant in a certain period while the detection light L2a and the reference light Lr are modulated, a low-frequency component or a DC component caused by the ambient light Lc is removed by the filter 192.

In addition, the signal extraction circuit for position detection 190 includes an adder circuit 193 with a feedback resistor 194 of about 220 kΩ after the filter 192. The position detection signal Vd extracted by the filter 192 is output to the signal separation circuit for position detection 170 as a position detection signal Vs superimposed on a voltage V/2 which is a half of the bias voltage Vb.

The signal separation circuit for position detection 170 includes a switch 171 which performs a switching operation in synchronization with a driving pulse applied to the first light source section for detection 12A, a comparator 172, and a capacitor 173 electrically connected to each input line of the comparator 172. Accordingly, when the position detection signal Vs is input to the signal separation circuit for position detection 170, an effective value Vea of the position detection signal Vs when the first light source section for detection 12A is turned on and an effective value Veb of the position detection signal Vs when the reference light source 12R is turned on are alternately output from the signal separation circuit for position detection 170 to the emission intensity compensation instruction circuit 180.

The emission intensity compensation instruction circuit 180 compares the effective values Vea and Veb and performs processing shown in FIG. 6B to output a control signal Vf to the light source driving circuit 140 so that the effective value Vea of the position detection signal Vs and the effective value Veb of the position detection signal Vs become the same level. That is, the emission intensity compensation instruction circuit 180 compares the effective value Vea of the position detection signal Vs with the effective value Veb of the position detection signal Vs and maintains the current driving condition when the effective values Vea and Veb are equal. In contrast, when the effective value Vea of the position detection signal Vs is lower than the effective value Veb of the position detection signal Vs, the emission intensity compensation instruction circuit 180 reduces the resistance value of the variable resistor 111 to increase the amount of light emitted from the first light source section for detection 12A. In addition, when the effective value Veb of the position detection signal Vs is lower than the effective value Vea of the position detection signal Vs, the emission intensity compensation instruction circuit 180 reduces the resistance value of the variable resistor 112 to increase the amount of light emitted from the reference light source 12R.

Thus, in the optical position detection device 10, the emission intensity compensation instruction circuit 180 of the position detecting section 50 controls the amount of control (driving current) for the first light source section for detection 12A and the reference light source 12R so that the amount of light detected by the light detecting section 30 during the lighting operation of the first light source for detection becomes equal to the amount of light detected by the light detecting section 30 during the reference light source lighting operation. Therefore, information regarding the driving current for the first light source section for detection 12A and the reference light source 12R which makes the amount of light detected by the light detecting section 30 during the lighting operation of the first light source for detection equal to the amount of light detected by the light detecting section 30 during the reference light source lighting operation is present in the emission intensity compensation instruction circuit 180, and such information is outputs to the position detecting section 50 as a position detection signal Vg.

The same processing is also performed between the second light source section for detection 12B and the reference light source 12R, and the position detection signal Vg output from the emission intensity compensation instruction circuit 180 is information regarding the driving current for the second light source section for detection 12B and the reference light source 12R which makes the amount of light detected by the light detecting section 30 during the lighting operation of the second light source for detection equal to the amount of light detected by the light detecting section 30 during the reference light source lighting operation.

In the optical position detection device 10 according to the present embodiment, when the first to fourth light source sections for detection 12A to 12D are turned on simultaneously, a light intensity distribution for Z coordinate detection in which the intensity decreases monotonically in a direction normal to the first surface 41 is formed at the first surface 41 side (detection space 10R) of the light transmissive member 40. In this light intensity distribution for Z coordinate detection, the intensity decreases monotonically as the distance from the first surface 41 of the light transmissive member 40 increases. Accordingly, in the Z coordinate detecting section 53 of the position detecting section 50, the Z coordinate of the target object Ob can be detected on the basis of the difference or ratio of the detection values in the light detecting section 30 when the reference light source 12R and the first to fourth light source sections for detection 12A to 12D are turned on alternately. In addition, in the Z coordinate detecting section 53 of the position detecting section 50, the Z coordinate of the target object Ob can be detected on the basis of the difference or ratio of the driving current for the reference light source 12R and the driving current for the first to fourth light source sections for detection 12A to 12D when detection values in the light detecting section 30 when the reference light source 12R and the first to fourth light source sections for detection 12A to 12D are turned on alternately become equal.

Main Effects of the Present Embodiment

As described above, in the optical position detection device 10 according to the present embodiment, the light source driving section 14 turns on the plurality of light source sections for detection 12 sequentially, and the light detecting section 30 receives the detection light L3 reflected from the target object Ob in the meantime. Then, using the detection result of the light detecting section 30, driving currents when the light source section for detection 12 is driven so that the light intensities of the detection light beams L3 emitted from the two light source sections for detection 12 and reflected from the target object Ob become the same intensity are detected. Then, the position detecting section 50 detects the position of the target object Ob by calculating the difference between the detected driving currents.

When seen from the detection space 10R, the light detecting section 30 is at the position not overlapping the plurality of light source sections for detection 12. Each of the plurality of light source sections for detection 12 includes the first light emitting elements 12A1 to 12D1 and the second light emitting elements 12A2 to 12D2. Therefore, the position detecting section 50 detects the position of the target object on the basis of a comparison result of the received light intensity in the light detecting section 30 when the first light emitting elements 12A1 to 12D1 are turned on and the received light intensity in the light detecting section 30 when the second light emitting elements 12A2 to 12D2 are turned on. In this way, the position of the target object Ob can be detected in both the case where the target object Ob is present outside the region between the light source sections for detection 12 and the case where the target object Ob is present inside the region between the light source sections for detection 12.

For this reason, when calculating the ratio of the distance between one of the two light source sections for detection 12 and the target object Ob and the distance between the other light source section for detection 12 and the target object Ob, there is no error in determining whether to specify the position of the target object Ob by internally dividing the distance between the two light source sections for detection 12 or to specify the position of the target object Ob by externally dividing the distance between the two light source sections for detection 12. Therefore, the position of the target object can be correctly detected.

In addition, the detection light L2 is not visible since the detection light L2 is infrared light. Accordingly, even if the optical position detection device 10 according to the present embodiment is applied to a display device, the display is not interrupted. For this reason, the optical position detection device 10 can be used in various kinds of apparatuses.

Other Embodiments

In the embodiment described above, the first light emitting elements 12A1 to 12D1 are turned on when performing the driving for acquiring the difference. However, the second light emitting elements 12A2 to 12D2 may be turned on when performing the driving for acquiring the difference. In addition, it is also possible to turn on the first light emitting elements 12A1 to 12D1 and the second light emitting elements 12A2 to 12D2.

Example of the Use of an Optical Position Detection Device

Figure 7A:
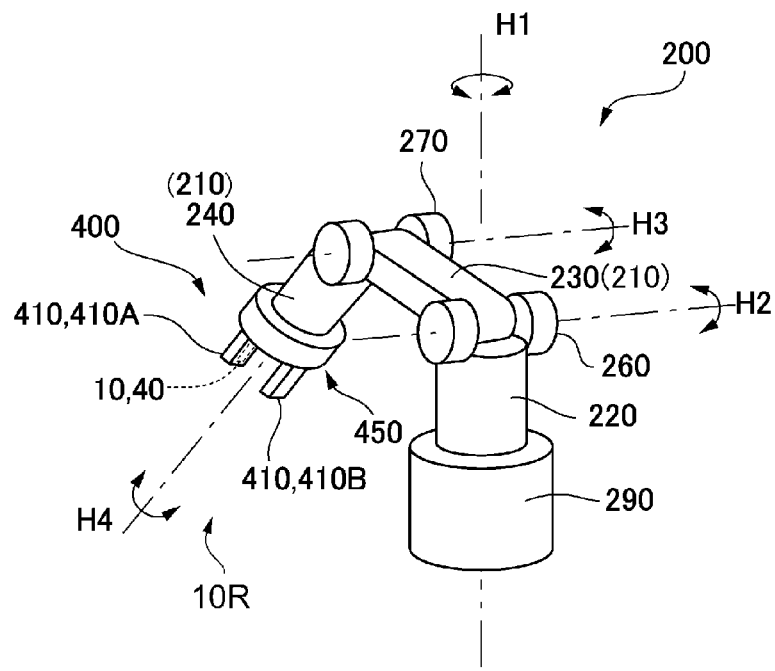
FIG. 7A is a schematic perspective view showing the configuration of a robot arm.
Figure 7B:
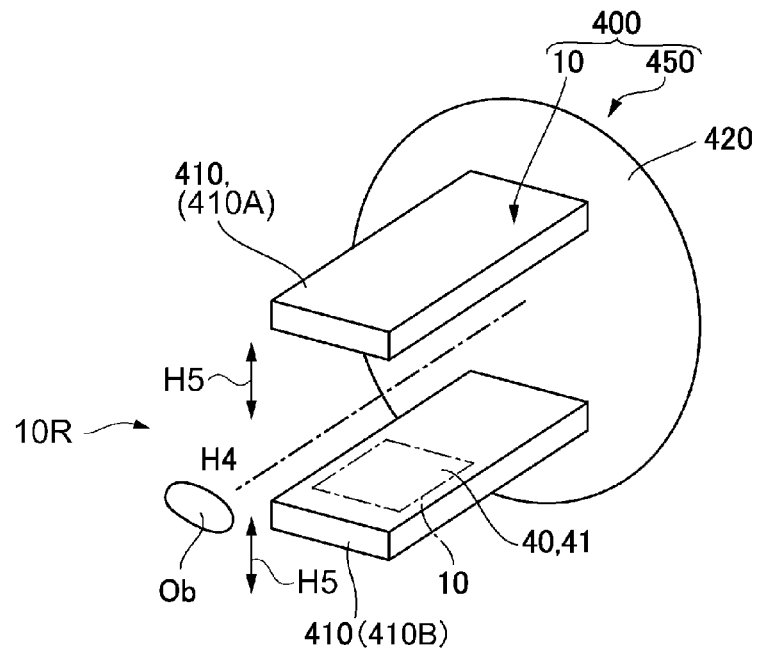
FIG. 7B is a schematic perspective view of main sections for explaining a hand apparatus.
Figure 8:
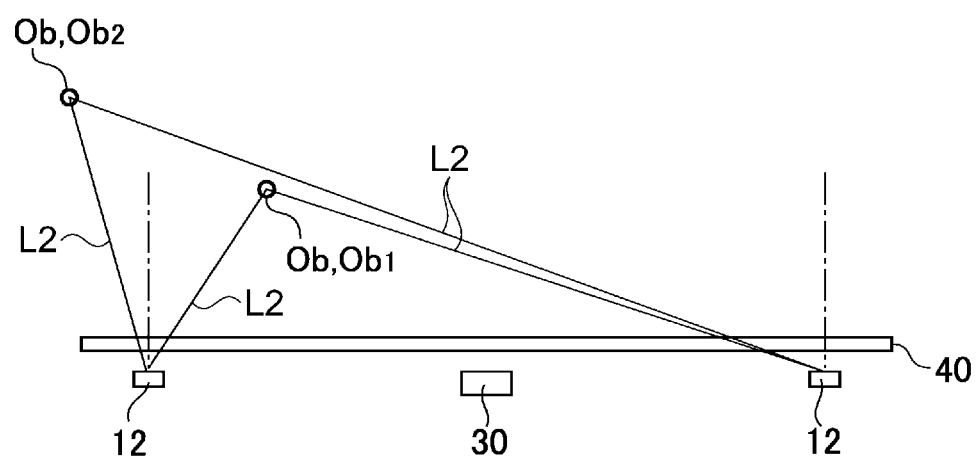
FIG. 8 is a schematic view for explaining a position detection method in the related art.

Referring to FIGS. 7A and 7B, a robot hand device using as a tactile sensor the optical position detection device 10 to which the invention is applied will be described. FIGS. 7A and 7B are schematic perspective views for explaining a robot arm in which the optical position detection device is provided as a tactile sensor in a hand device. FIG. 7A is a schematic perspective view showing the configuration of a robot arm, and FIG. 7B is a schematic perspective view of main sections for explaining the hand device.

A robot arm 200 shown in FIG. 7A is an apparatus which works for a numerically-controlled machine tool or supplies and retrieves tools. The robot arm 200 includes a base 290, a strut 220 standing upright from the base 290, and an arm 210 connected to the strut 220. The arm 210 includes a first arm portion 230, which is connected to the distal end of the strut 220 through a first joint 260, and a second arm portion 240, which is connected to the distal end of the first arm portion 230 through a second joint 270. The strut 220 can rotate around the axis H1 perpendicular to the base 290. The first arm portion 230 can rotate around the horizontal axis H2 at the distal end of the strut 220 by the first joint 260. The second arm portion 240 can rotate around the horizontal axis H3 at the distal end of the first arm portion 230 by the second joint 270. A hand 450 of the hand device 400 is connected to the distal end of the second arm portion 240, and the hand 450 can rotate around the axis H4 of the second arm portion 240.

As shown in FIG. 7B, the hand device 400 has the hand 450 with a plurality of grasping claws 410 (grasping tools). The hand 450 includes a disk-shaped grasping claw holding body 420 which holds bases of the plurality of grasping claws 410. The hand 450 includes first and second grasping claws 410A and 410B as the plurality of grasping claws 410. Both the two grasping claws 410 can move in a direction becoming closer to or away from each other, as indicated by the arrow H5.

When gripping the target object Ob in the robot arm 200 configured in this way, the strut 220 and the first and second arm portions 230 and 240 rotate in predetermined directions to bring the hand 450 close to the target object Ob (workpiece), and then the two grasping claws 410 move in a direction becoming closer to each other to grasp the target object Ob.

Here, the optical position detection device 10 is provided in each of the first and second grasping claws 410A and 410B. The inner surface of the grasping claw 410 which comes in contact with the target object Ob when grasping the target object Ob (workpiece) is the first surface 41 of the light transmissive member 40 of the optical position detection device 10 described in the above embodiment. Accordingly, when the grasping claw 410 grasps the target object Ob, the optical position detection device 10 detects the positions or the relative positions of the target object Ob and the grasping claw 410, and this detection result is fed back to a driving control section of the grasping claw 410. Therefore, since the grasping claw 410 can be brought close to the target object Ob at high speed, it is possible to realize a high-speed workpiece grasping operation.

Since the optical position detection device 10 can detect the position of the target object Ob accurately, the hand device 400 can grasp the target object Ob reliably.

The entire disclosure of Japanese Patent Application No. 2011-086072, filed Apr. 8, 2011 is expressly incorporated by reference herein.

What is claimed is:

1. An optical position detection device that detects a position of a object optically, comprising:
    a plurality of light source sections that emit detection light in an emission direction and are separated from each other in a direction crossing the emission direction;
    a light detecting section that receives the detection light reflected from the object;
    a light source driving section that turns on the light source sections; and
    a position detecting section that detects the position of the object on the basis of a light receiving result of the light detecting section,
    wherein each of the light source sections includes first to third light emitting elements for detection disposed on a straight line, and
    the position detecting section detects the position of the object using a first detection position, which is obtained when calculating the position of the object using the first and second light emitting elements, and a second detection position, which is obtained when calculating the position of the object using the first and third light emitting elements.

2. The optical position detection device according to claim 1,
    wherein the position detecting section calculates the first detection position from light intensities of light beams emitted from the first and second light emitting elements and a light intensity of the detection light received by the light detecting section and calculates the second detection position from light intensities of light beams emitted from the first and third light emitting elements and the light intensity of the detection light received by the light detecting section.

3. The optical position detection device according to claim 1, wherein assuming that the emission direction of the detection light is a Z-axis direction and two directions crossing the Z-axis direction are an X-axis direction and a Y-axis direction, the plurality of light source sections include the light source sections separated from each other in the X-axis direction and the light source sections separated from each other in the Y-axis direction.

4. The optical position detection device according to claim 1, further comprising:
a reference light source that emits reference light incident on the light detecting section without being reflected by the object,
wherein the position detecting section detects the position of the object by changing a combination of the reference light source and some of the plurality of light source sections on the basis of a light receiving result of the light detecting section.

5. The optical position detection device according to claim 1,
wherein the position detecting section detects the position of the object in the emission direction of the detection light on the basis of a light receiving result of the light detecting section when the plurality of light source sections are turned on simultaneously or sequentially.

6. The optical position detection device according to claim 1,
wherein the detection light is infrared light.

* * * * *